March 13, 1962 W. L. MORGAN ET AL 3,025,202
METHOD OF MANUFACTURING A FIBROUS PRODUCT
Filed April 24, 1957 5 Sheets-Sheet 1

INVENTOR:
Willard L. Morgan
Albert R. Morrison
BY Richard E. Shannon

ATTORNEYS

March 13, 1962 W. L. MORGAN ET AL 3,025,202
METHOD OF MANUFACTURING A FIBROUS PRODUCT
Filed April 24, 1957 5 Sheets—Sheet 2

INVENTORS:
Willard L. Morgan
Albert R. Morrison
BY Richard F. Shannon
ATTYS.

March 13, 1962 W. L. MORGAN ET AL 3,025,202
METHOD OF MANUFACTURING A FIBROUS PRODUCT
Filed April 24, 1957 5 Sheets-Sheet 3

INVENTORS
Willard L. Morgan
Albert R. Morrison
BY Richard F. Shannon

ATTORNEYS

March 13, 1962 W. L. MORGAN ET AL 3,025,202
METHOD OF MANUFACTURING A FIBROUS PRODUCT
Filed April 24, 1957 5 Sheets-Sheet 5

INVENTOR.
Willard L. Morgan
Albert R. Morrison
BY Richard F. Shannon

ATTORNEYS

United States Patent Office
3,025,202
Patented Mar. 13, 1962

3,025,202
METHOD OF MANUFACTURING A FIBROUS PRODUCT
Willard L. Morgan and Albert R. Morrison, Newark, and Richard F. Shannon, Lancaster, Ohio, assignors to Owens-Corning Fiberglas Corporation, a corporation of Delaware
Filed Apr. 24, 1957, Ser. No. 654,744
3 Claims. (Cl. 156—34)

This invention relates to a method for producing a composite foam and mineral fiber product, and, more particularly, to a method for producing such a product composed of mineral fibers associated with a foamed material.

Various suggestions have heretofore been made for producing structures composed of a foamed material in a set condition, which set condition can range from elastomeric, as in the case of foamed rubber, through various intermediate degrees of hardness to substantially unyielding materials, as in the case of foamed inorganic cementitious materials which have found some use as insulating materials.

It has also been suggested that various fillers, fibrous and granular in nature, can be admixed with numerous foamed materials, prior to hardening or setting thereof, in order to modify the properties of a finished article produced after setting of the foams. For example, the use of dyes or pigments to color the finished products; the use of inert finely divided extenders; and the use of fibrous fillers to increase the strengths, have all been suggested. A serious problem has been encountered, however, when it has been attempted to increase the strengths or other physical properties, by admixing a fibrous filler with a foamable resin and then setting the resin. It has been found that most methods which might be expected to be capable of achieving the desired result enable the introduction of only a comparatively small proportion of the fibrous filler, with the result that achieving substantially improved physical properties by virtue of incorporation of the fibrous filler in the foamed material is impossible.

When fibrous fillers of sufficient length to be effective at improving physical properties are mixed with a material to be reinforced in sufficient amount to be significantly advantageous, it is found that balling occurs during attempted mixing. In general, limited amounts of fibers of any given length and diameter can be so mixed without balling. However, the tendency towards balling increases when fiber diameter is decreased, and when the length is increased. Fibers having a diameter more than about 150 hundred thousandths of an inch, and fibers shorter than about ½ inch, are not significantly effective for reinforcement. Fibers having a diameter less than 150 hundred thousandths of an inch, and longer than about ½ inch, cannot be mixed in effective proportions, without balling, with a material to be reinforced.

It has been found that the addition of a fibrous material to a liquid foamable material causes an increase in viscosity of the foamable material with the result that it is very difficult to stir in more than about 10 percent by weight of fibers, based upon the weight of the foamable material. Mixing a fibrous material into a liquid foamable material always causes some damage to the fibers. The damage may involve breaking, which decreases fiber length and lowers strand integrity. As a consequence, physical properties of the final product are inferior to those which would be achieved with any given amount of a particular fibrous reinforcement if the fibers were not damaged during mixing.

The present invention is based upon the discovery of an improved method for producing a structure which includes mineral fibers associated with or bonded to a foamed, set material, which method enables the production of such a structure containing a heretofore unachievably high proportion of the mineral fibers, and is extremely effective for producing such structures comprising mineral fibers and a foamed, set material in any desired proportions within an extremely broad range.

In general one step in the method of the invention comprises projecting into association with an advancing plurality of glass or other mineral fibers, either freely suspended or loosely associated, a binder or other material which is formable, foaming, or foamed. Another step involves collecting fibers and associated material, and a final step comprises advancing the material to a foamed, set condition, associated with or bonded to the fibers.

It is, therefore, an object of the invention to provide an improved method for producing a structure which includes mineral fibers associated with or bonded to a foamed, set material or binder.

It is a further object of the invention to provide an improved structure which includes mineral fibers associated with or bonded to a foamed, set material or binder, which structure can be produced by a new method of the invention.

It is another object of the invention to provide a method for bringing fibers and a foamable, foaming, or foamed binder or other material into association and for collecting the associated fibers and material into a pack having predetermined dimensions wherein the foamed material is disposed within interstices separating fibers from one another.

Other objects and advantages will be apparent from the description which follows, reference being had to the accompanying drawings, in which—

Figure 1:
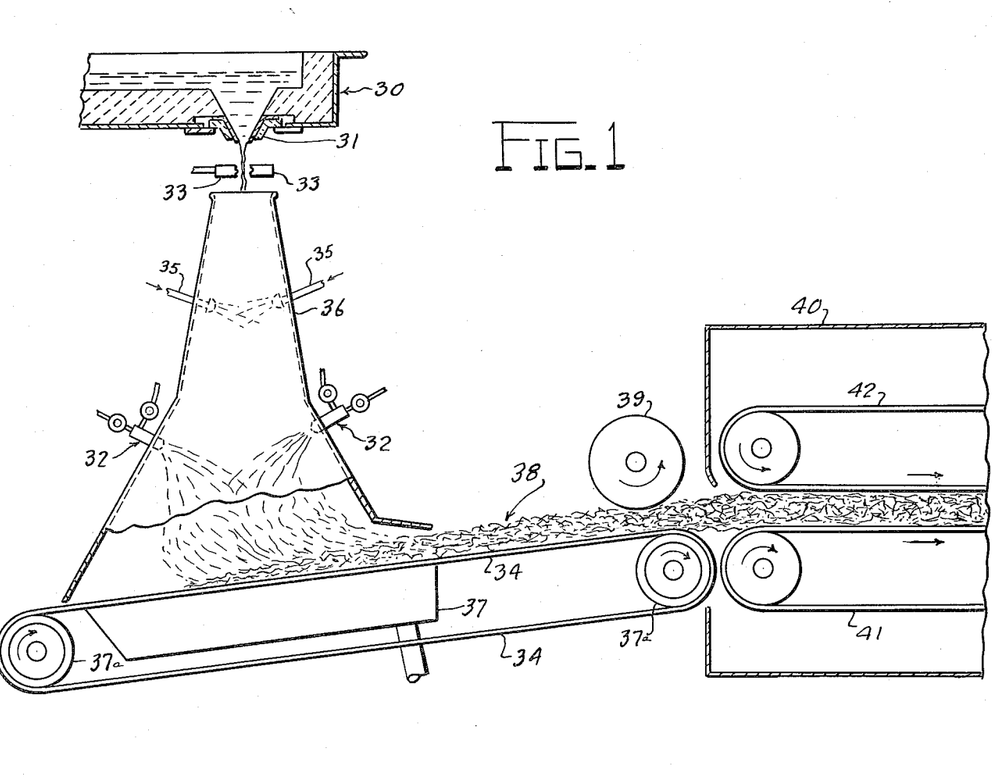
FIG. 1 is an elevational view of apparatus for producing fibers wherein the fibers are formed by flowing streams of a molten material through small diameter orifices and extending the streams by the action of a blast of air or steam upon the molten streams, and for associating such fibers with a foamed, set material.

Referring now in more detail to the drawings, apparatus shown in FIG. 1 comprises a glass melting tank indicated generally at 30 containing molten glass which can flow in relatively small diameter streams through orifices in a bushing 31 in the bottom of the tank 30, inlet means indicated generally at 32 from which a foamable, foaming or foamed material is associated with fibers of glass or other mineral which are produced from the streams by means of blowers 33, and a foraminous conveyor 34 on which the fibers associated with the material are collected. Spray nozzles 35 are also provided for use in applying a suitable binder, if desired, to the fibers. The fibers which are drawn from the streams of molten glass by a blast of air, steam or the like from the blowers 33 are projected downwardly by the blast inside a hood 36, and onto the conveyor 34, a vacuum box 37 being provided to facilitate collection of the fibers associated with the foamable, foaming or foamed material on the conveyor. The means 32, which can conveniently be spray nozzles, open tubes, or other means appropriate for introduction of a particular desired material, extend through openings in the hood 36, so that the material can be associated with the fibers therein. The conveyor 34 extends around suitably mounted rolls 37a, at least one of which is driven in the direction indicated by the arrows. A mass 38 comprising intermeshed glass or other mineral fibers associated with a foamable, foaming or foamed material is collected continuously on the conveyor 34.

In the specific embodiment of the invention shown in FIG. 1, the mass 38 is advanced by the conveyor 34 under a compressing roll 39 which increases the intimacy of association between the fibers and the material, and is then advanced into a curing oven 40 through which it is conveyed in a confined space between suitably driven, and preferably impervious, conveyors 41 and 42. When the material associated with the fibers is foamable, the heat from the oven 40 carries both foaming and setting thereof. When the material was either foamed or foaming as introduced through the means 32, only setting proceeds in the oven 40.

In general, the foamable, foaming or foamed material introduced through the means 32, and associated with glass or other mineral fibers in the FIG. 1 and other embodiments of the invention, can be thermoplastic or thermosetting in nature, can be either organic or inorganic, and can be naturally occurring or synthetically produced. Specifically, foamable, foaming and foamed materials disclosed in a co-pending application filed March 14, 1957, by Willard L. Morgan, Albert R. Morrison and Richard F. Shannon, Serial No. 646,143, are suitable. What material is preferred depends upon various considerations, such as the ultimate use and properties required in the finished product, available equipment, cost, and the like. The binder, if any, used to interlock glass or other mineral fibers, as is subsequently discussed in more detail, can also be any of those disclosed in the identified co-pending application.

A particularly advantageous product can be made in the FIG. 1 apparatus by associating a foamable material with the glass or other mineral fibers within the hood 36. As a specific example, expansible polystyrene beads can be used, and the operation controlled so that the beads remain expansible in the mass 38, for example by avoiding subjection of the expansible beads to any temperature sufficient to cause expansion thereof. The roll 39 can then be eliminated, and the mass 38 broken up to produce small masses comprising glass or other mineral fibers intimately associated with the expansible polystyrene beads. Such masses can then be blown into a confined zone and there heated to cause expansion of the polystyrene beads, in situ, for example in a space to be insulated. A foamable, thermosettable, phenolformaldehyde binder material can also be used instead of the expansible polystyrene beads. When employed, the foamable phenol-formaldehyde binder is preferably one that can be dried to a solid, foamable, and thermosettable condition. In such case, the roll 39 can advantageously be employed to increase the intimacy of association of the phenolic material with the glass or other fibers, and the conveyors 41 and 42 are preferably so positioned relative to one another that the finished product has a comparatively high apparent density by virtue of compression of the mass of fibers and associated foamable binder. Such product can be shipped in a high density condition, either in relatively large masses or subdivided to any desired extent. Subdivided masses thereof, for example of the order of one cubic inch or less, can be blown in place and expanded and cured by the action of heat to produce foamed in situ insulation, as described. Steam or other heated gas can be used both for blowing, and to supply heat.

When the expansible material associated with the mass of intermeshed mineral fibers in the intermediate product 38 is of an appropriate type, a different and extremely useful kind of high density expansible material can be produced. Specifically, when the material is a sticky, viscous resin which can be converted by heat to a foamed, set condition, the intermediate product 38 can be subdivided to a desired extent and charged into a sigma bladed mixer or a compressing extruder and formed into a pully-like mass. When a compressing extruder is employed, a foamable molding material in elongate form and of any desired cross-section is delivered directly from the extruder. The material can be cut into lengths, as required for a particular article to be produced, placed in an appropriate mold, and subjected to heat to cause foaming and curing. When the material is produced in a sigma bladed mixer, or the like, an irregular mass of putty-like material results. Fragments of such irregular mass can be similarly fabricated into finished products, or sheets can be produced from the mass by means of cooperating rolls, or an elongate section of any desired cross-section can be produced by extrusion. Polyester resins suitable for use in the production of compositions of this type are disclosed in detail in U.S. Patent 2,549,732, which suggests the use of such resins to produce a "putty-like" molding material which is not foamable. Phenolic and other resins having similar properties in the uncured state can also be employed. Such resins, of course, must be made foamable, as discussed herein, for use in producing such an expansible material in accordance with the invention.

It will be appreciated that the comparatively high density foamable materials discussed in the two preceding paragraphs, during final heating to produce foamed and set products, become thermal insulation when expansion begins. In some instances, therefore, expansion may effectively insulate interior portions of any given mass and prevent foaming or expansion and cure thereof. This phenomenon can be minimized by comparatively fine subdivision of the foamable material so that no part of a mass thereof is sufficiently remote from a surface, even after expansion, to remain non-expanded. In order to minimize the effect of this phenomenon, independently of particle size, it is usually preferred that the expansible material be one which undergoes an exothermic reaction when subjected to heat, so that interior portions of the material are heated by exotherm from adjacent portions thereof, with the result that foaming and curing are complete throughout the entire body of the material.

The product 38 shown in FIG. 1 comprises a mass of intermeshed mineral fibers associated with a foamable, foaming or foamed material. The production of such a product is one of the objectives of the instant invention. The mineral fibers in the mass must be intermeshed to an extent such that the mass has bodily integrity. The fibers in the product 38 are intermeshed, by virtue of the method by which they are produced, to such extent, even though no binder is applied thereto. The application of a suitable binder, for example a phenolformaldehyde partial condensation product applied through the spray nozzles 35, tends to increase the bodily integrity of the mass of mineral fibers by interlocking of the mineral fibers to one another. Such action is independent of any bonding by the foamable, foaming or foamed material associated with the mineral fibers through the means 32.

In general, any mass of mineral fibers has bodily integrity if the mass moves as a whole when it is picked up by any part, or if the mass will support its own weight across a limited but appreciable unsupported span, as between two conveyors, or from a conveyor to a pair of cooperating drive rolls. A mass of mineral fibers can have the degree of bodily integrity defined above when the individual fibers therein are of a sufficient average effective length, usually from ½ inch to about 3 inches, and are intermeshed with one another, so that, in such cases, the use of a binder or size is not essential to provide the bodily integrity.

A foamable, foaming, or foamed material associated with a mass of mineral fibers having a lesser degree of bodily integrity than that identified in the examples of the preceding paragraph can also be produced in practicing the present invention. The minimum requisite degree of bodily integrity is the least which will enable the mass to withstand, without substantial fiber deformation, the forces to which the mass is subjected during production of a final product. The minimum requisite degree of bodily integrity, therefore, depends upon the stresses exerted on the mass during a particular series of processing operations. The stresses that are exerted are partly mechanical in nature, incident to handling of the mass, and partly incident to the foaming, setting, or both, of the material while associated with the mass.

The mass of mineral fibers must not only have the requisite degree of bodily integrity, as indicated, but must also be one wherein the mineral fibers are present in an open pattern, so that a final product can be made wherein a foamed material, in a set condition, is disposed in voids within the mass of mineral fibers. The degree of openness of the mass and the diameters of the individual fibers, as well as the viscosity of the material, while foaming, and the stage in which the material is associated with the fibers, all affect the stresses to which the mass is subjected during processing, but these variables are within operable limits so long as the mass itself has bodily integrity during the processing.

Figure 2:
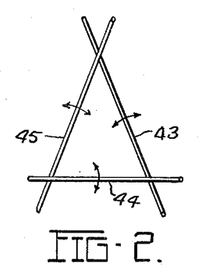
FIG. 2 is a plan view of a fragment of an open mass of mineral fibers useful in practicing the invention, and representing one type of intermeshing of fibers, which relies upon no binder, which can give bodily integrity to the mass.
Figure 3:
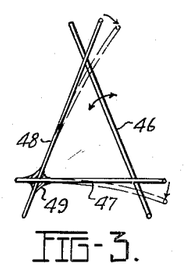
FIG. 3 is a plan view similar to FIG. 2 showing a modified type of intermeshing where some binder is effectively contributing to the bodily integrity of the mass by interlocking individual fibers.

Various types of masses of mineral fibers which can have the requisite degree of bodily integrity are represented fragmentarily in FIGS. 2 through 5, inclusive. A fragment of a mass comprising mineral fibers 43, 44 and 45, which mass is produced without any binder, is shown in FIG. 2. The fragment, in FIG. 2 and in other figures, is represented as generally triangular, and planar, because such is the simplest mechanical arrangement. It will be apparent, however, that various other spatial arrangements of fibers occur in any mass of mineral fibers that is produced. The mass has bodily integrity solely by virtue of frictional forces exerted by one fiber on the others. A mass comprising mineral fibers 46, 47 and 48, where the fibers 47 and 48 are bonded to one another by a globule 49 of any suitable binder is shown in FIG. 3. The fibers 43, 44 and 45 of the FIG. 2 structure are free to move, when subjected to forces which will overcome the friction which gives the mass bodily integrity, as is indicated by the arrows. In the FIG. 3 structure, on the other hand, only the fiber 46 is free to move in a similar manner, as the fibers 47 and 48 are retained in position by the globule 49. The unbonded ends of the fibers 47 and 48, however, are free to bend generally as suggested by the dotted positions represented for these fibers.

Figure 4:
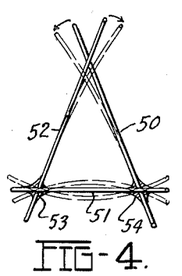
FIG. 4 is a view similar to FIG. 3, but showing a greater quantity of binder effective to increase bodily integrity.

A fragment of a mass comprising mineral fibers 50, 51 and 52 is shown in FIG. 4. The fiber 51 is bonded by globules 53 and 54 of a suitable binder to the fibers 52 and 50, respectively. The fibers 51, therefore, is supported in a substantially fixed position, but each of the fibers 50, 51 and 52 is free to bend under stress generally as is indicated by the dotted positions represented.

Figure 5:
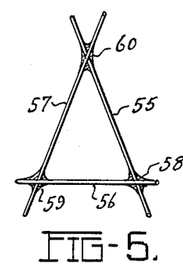
FIG. 5 is a view similar to FIGS. 3 and 4, but showing a still greater amount of binder effective to increase bodily integrity.
Figure 6:
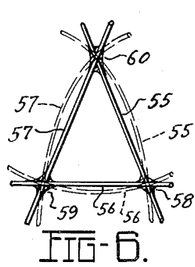
FIG. 6 is a view similar to FIG. 5, but showing a type of fiber movement which is possible in the FIG. 5 structure when the mass is subjected to a load.

A fragment of a mass comprising mineral fibers 55, 56 and 57 wherein the fibers 55 and 56 are bonded together by a globule 58 of a suitable binder, the fibers 56 and 57 are bonded together by a globule 59 of a suitable binder, and the fibers 55 and 57 are bonded together by a globule 60 of a suitable binder, is represented in FIG. 5. All of the fibers in FIG. 5 mass are rigidly held in position, and are free only to bend, when subjected to stress, generally to the dotted positions represented in FIG. 6, or to corresponding positions where at least one of the fibers bends in any other direction or plane in the space surrounding the fragment of the mass. It will be appreciated that any given mass of intermeshed fibers which includes a binder will include some structure of the type shown in FIG. 3, some of the FIG. 4 type, and some of the FIG. 5 type. Which type of structure predominates will depend upon the relative amounts of fiber and binder, and various other factors. FIGS. 2 through 5 are merely representative and in these figures the globules of a binder shown as located at the glass fiber junctions will be understood to be actually of many other shapes.

When relatively long lengths of mineral fibers are intermeshed in a mass, that mass has bodily integrity by virtue of the intermeshing. A binder, other factors being equal, tends to increase the bodily integrity by interlocking fibers in the mass. Therefore, in general, for any given fiber length, the stiffness of the mass or pack of fibers increases from the FIG. 2 structure to the FIG. 3 structure, from the FIG. 3 structure to the FIG. 4 structure, and from the FIG. 4 structure to the FIG. 5 structure.

The physical properties of a final material produced by the method of the invention can be varied within relatively broad limits by varying the characteristics of the mass of mineral fibers, the identity of the foamed material associated therewith, and the amount and nature of the foaming agent therein. The effect of variations in extent of bonding between individual fibers upon rigidity of a mass thereof has previously been discussed. The proportion of glass or other mineral fibers in a final product, the diameters of the fibers, the modulus of the fibers, the modulus of the binder, the unsupported lengths of fibers, the bond strength of the binder to the fibers, the effect of any coating on the fibers and the orientation of the fibers in the mass all affect the resiliency, the flexibility, the rigidity, and the load bearing ability of the final products. In general, other factors being equal, the flexibility, the resilience and the load bearing ability, or the rigidity, of a finished product can be expected to be related to these properties in the mass of mineral fibers contained therein. Other factors also contribute to the physical properties of the final products. For example, average effective cell size in the foamed material, whether or not the foamable material is a binder for the glass fibers, whether or not the fibers are wet by the foamed material, whether or not the fibers, the foam cells, or both are coated by a nonfoamed material, and the physical properties of the foamed material itself are all variables which influence the physical properties of the final product.

Several variations in structure of the finished product that can be achieved according to the method of the invention are shown in FIGS. 7 through 13. In all of these figures, the mass of intermeshed mineral fibers is represented as being of the type shown in FIG. 5, although the same variations can be accomplished where the mass of mineral fibers is of any of the types shown in FIGS. 2, 3 and 4. In each of FIGS. 7 through 13, the three mineral fibers 55, 56 and 57 are shown bonded together, as described, by globules 58, 59 and 60 of a binder. It will be appreciated that the globules of binder are not necessarily spherical in shape, but may be of any of various configurations.

Figure 7:
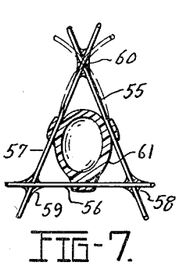
FIG. 7 is a plan view of a fragment of a mass of intermeshed and interlocked mineral fibers intimately associated with a foamed material.

In FIG. 7, a single cell 61 of a foamed material is shown intimately associated with the three fibers. A structure of this type is formed in accordance with the method of the invention when the foam cells are few and relatively large. The generally spherical shape of the cell or bubble indicates that the ability of the foamable material to wet the fibers is relatively low.

Figure 8:
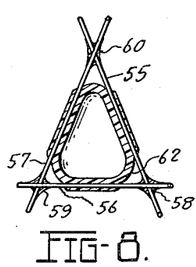
FIG. 8 is a view similar to FIG. 7, but showing a different configuration of a foamed material intimately associated with the fibers.

In FIG. 8, a single cell 62 of a foamed material is shown intimately associated with the three fibers. The comparatively large cell or bubble 62 conforms substantially to the shape formed by the fibers, indicating that the fibers are relatively readily wetted by the foamed material so that the adhesive forces between the fibers and the bubble are comparatively high.

Figure 9:
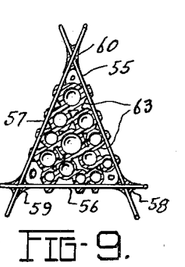
FIG. 9 is a view similar to FIGS. 7 and 8, but showing a plurality of small cells of a foamed material intimately associated with the fibers.

Both of the structures shown in FIGS. 7 and 8 include relatively large bubbles of the foamed material such as might be produced when foamable powders are associated with the fibers. In FIG. 9 a preferred structure is shown which includes a plurality of small bubbles 63 of a foamed material. The bubbles are represented as being substantially spheroidal, as in the FIG. 7 structure, which is probably an idealized structure, as irregular polyhedral cells are to be expected. The small size of the bubbles and their uniform distribution in the FIG. 9 structure is advantageous because the product has higher thermal insulating properties, compressive strengths and resiliency. The use of a foamable material having a low surface tension and containing a finely divided and uniformly distributed foaming agent facilitates the production of such structures.

Figure 10:
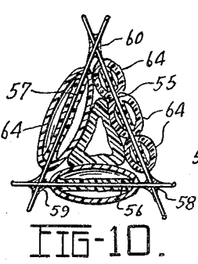
FIG. 10 is a fragmentary plan view showing still another spatial configuration of foamed material intimately associated with a mass of mineral fibers.

Still another type of foam cell or bubble 64 is shown in FIG. 10. Each of these bubbles is generally ovaloid in shape, with several of the cells or bubbles having one of the mineral fibers extending therethrough. Such a foam structure might be achieved when the foamable material was applied as a liquid resin to the mineral fibers. To form this kind of structure, the material must be one which adheres to the mineral fibers. In this case, there would probably remain a thin layer of the foamable material on at least some of the mineral fibers, which layer would be converted to a set condition along with the rest of the material.

Figures 11, 12, 13:
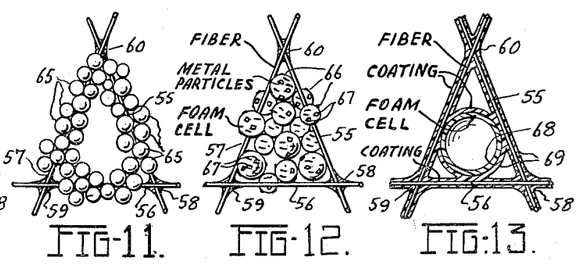
FIG. 11 is a plan view showing a fragment of a mass of intermeshed mineral fibers intimately associated with a foamed material which is adhered to the fibers.
FIG. 12 is a view similar to FIG. 9, but showing a second material which might be metal particles, and a foamed material, both intimately associated with a mass of mineral fibers.
FIG. 13 is a view similar to FIG. 7, but showing the structure which results from a further modification involving the application of a binder, as a coating.

A plurality of small cells or bubbles 65 are shown in the FIG. 11 structure clustered about the three mineral fibers. This is a preferred type of structure in a product of the invention.

In general, the conditions which tend to cause a structure of the FIG. 10 type, will cause a structure of the FIG. 11 type if the foamable material is one which produces a plurality of small cells or bubbles and the fibers are well coated with a foamable binder. A finished product which is predominately of the FIG. 11 type will probably also include some portions which are similar to the FIG. 9 structure, and, in general, portions similar to the structures shown in FIGS. 7, 8 and 10, and may even include some portions similar to structures of FIGS. 2 through 6. Similarly, when any of the structures of FIGS. 7 through 10 predominates, corresponding variations can be expected. The properties of the final products depend upon what type of structure predominates. The methods of the invention enable the making of final products wherein any of these structures predominates.

In general, surface tension of a liquid resin, during foaming and curing, is the major factor which controls cell size. By decreasing the particle or droplet size of the foaming agent, and increasing the uniformity of distribution thereof, average cell size of the final foam can be decreased. By increasing the viscosity of the foamable material at the time of foaming, the average cell size after foaming can be decreased, and the apparent density of the foam can be increased. When foaming into a confined space, cell size can be decreased, and apparent density increased, by decreasing the size of the confined space. The nature and amount of blowing agent used, and the temperatures also affect the cell size. Suitable wetting agents are polyethylene oxides, polyethylene-sorbitan monopalmitate, polyoxyethylene sorbitan trioleate, lauryl sodium sulfate, alkyl aryl polyether alcohols, and alkyl benzene sodium sulfonates.

Many materials can be employed to vary the wetting of the fibers by the material, and the adhesion of the material, after setting, to the fibers. For example, the above listed wetting agents generally tend to increase the ability of a material to wet when the material is applied as an aqueous dispersion of a binder, as well as to affect the foam cell size by lowering surface tension. The use of various coupling agents to pretreat the fibers also affects the ability of fibers to be wetted by an applied binder, whether cellular or cell producing, or otherwise. Where an epoxy, melamine, urea formaldehyde or phenolic resin is foamed with fibers, a gamma aminopropyltriethoxysilane pretreatment of the fibers improves the wetting of and adhesion to the fibers, and the strength of the final products. Pretreating the fibers with vinyltriethoxysilane an alkyl triacetoxysilane, or methacrylatochromic chloride gives improved wetting and adhesion where the foamed resin is a polyester or polyurethane. Conversely, where it is desired to provide a looser structure, the pretreatment of the fibers with a dimethyl polysiloxane or with octadecyltrichlorosilane will give poor wetting and low adhesion between fibers and many resin foams.

The structure shown in FIG. 12 is similar to that of FIG. 9, in that it includes a plurality of comparatively small cells or bubbles 66 of a foamable material distributed within the shape formed by the three fibers. In the FIG. 12 structure, however, a second material, shown as fine particles 67 of metal, is also distributed in the interstices separating the bubbles, and may be codeposited with the mass of mineral fibers, may be carried into the mass by the foaming resin, or may be introduced by a post treatment of the article after setting of the foamed material. The particles 67 can also be glass beads, which act essentially as fillers, expandable polystyrene beads, or can be a hardened material such as a hardened synthetic resin which will tend to reinforce and strength the product. In addition, the material can be a pigment, a dye, an inorganic filler, such as calcium carbonate, or a low density inorganic filler.

A structure shown in FIG. 13 is similar to that of FIG. 7, comprising a single relatively large cell or bubble 68 of a foamed material contacting each of the three mineral fibers shown. In addition, however, the entire product, after foaming, has been treated with a settable material as for example, an A-stage water soluble phenol formaldehyde resin which wets both the mineral fibers and the foamed material well, so that this settable material, after conversion to a set condition by heat or otherwise, appears as a coating 69 on the surfaces both of the fibers and of the bubble.

Figures 14, 15:
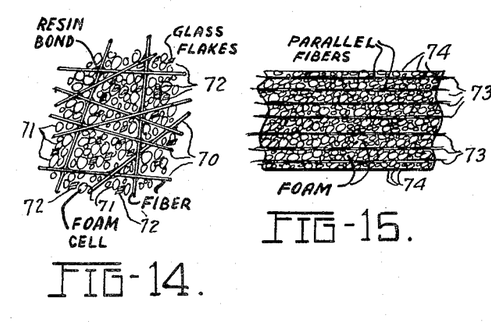
FIG. 14 is a view similar to FIG. 12, but showing the modification where the mass of mineral fibers is intimately associated both with glass flakes and with a foamed material.
FIG. 15 is a stylized representation showing a plurality of generally parallel mineral fibers intimately associated with a foamed material.

A product shown to a somewhat enlarged scale in FIG. 14 is similar to that of FIG. 12, comprising intermeshed mineral fibers 70, and a plurality of small cells 71 of a foamed material associated therewith. Glass flakes or platelets 72 are also incorporated in the structure to act as vapor barriers and to reduce the permeability of the product.

When a product having high strength in one direction only is desired a product such as that shown in FIG. 15 can be produced. The product comprises a plurality of parallel glass fibers 73 bonded together by cells or bubbles 74 of a foamed material, and can be produced with apparatus similar to that of FIG. 17, but modified so that parallel fibers are advanced into a zone where they are associated with a foamable binder, and are maintained in parallelism while the binder is foamed and set.

Figures 16, 17:
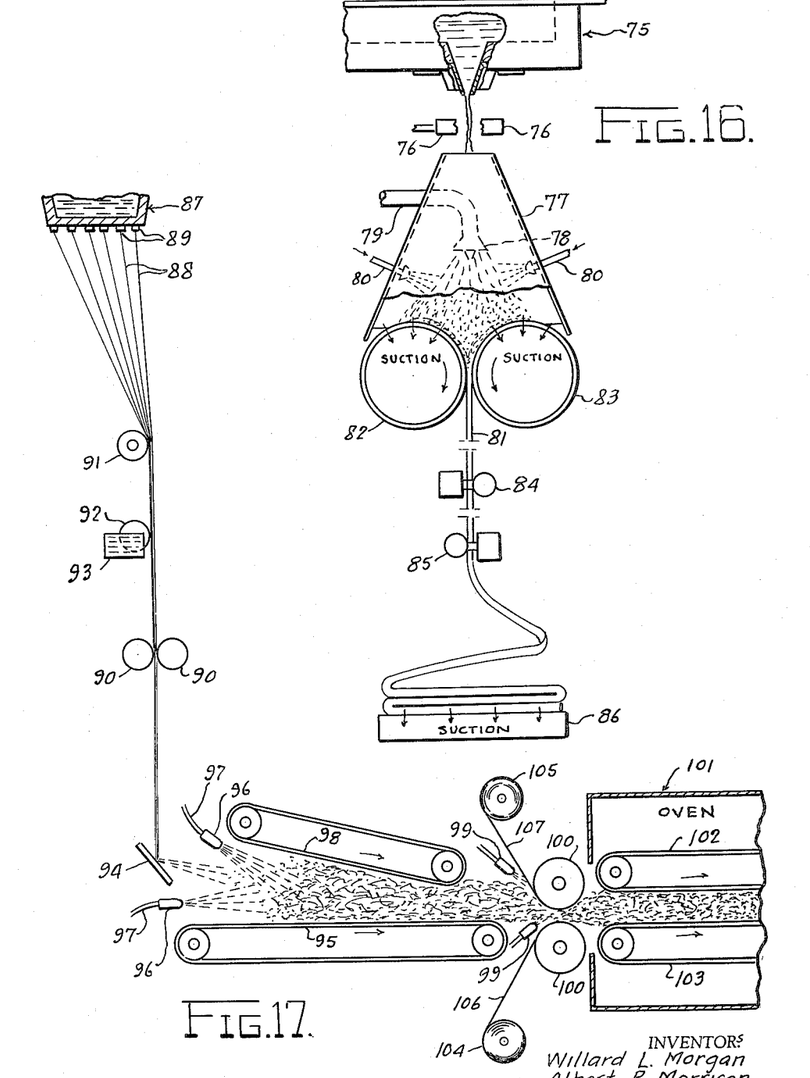
FIG. 16 is an elevational view of apparatus similar to that of FIG. 1 for forming fibers and for processing such fibers according to a modification of the process of the invention to produce a similar product.
FIG. 17 is a view in elevation of apparatus for producing continuous fibers, and for forming such continuous fibers into an intermeshed mass associated with a foamed, set material.

Apparatus shown in FIG. 16 is similar to that of FIG. 1 in that it includes a glass melting tank indicated generally at 75 with a bushing at the bottom thereof having orifices through which streams of glass or other similar mineral flow to be attenuated into fibers by streams of air, steam, or the like from blowers 76. The fibers are projected downwardly into a zone enclosed by a hood 77, and are there associated with a foamable material, which is preferably a foamable binder, discharged from a spray or tube 78 operatively associated with an inlet pipe 79. Spray heads 80 are also provided for the application, if desired, of a suitable binder or the same or a different foamable material to fibers of glass or other mineral. Fibers associated with the foamable material are collected in a veil 81 on vacuum drums 82 and 83 which are preferably disposed a substantial distance, e.g. as much as 50 feet, below the blowers 76, and the veil 81 is stripped from the drums, passed along suitably driven rolls 84 and 85 and accumulated on a vacuum collector 86 disposed below the rolls 84 and 85.

The apparatus of FIG. 16 is particularly suitable for use in associating expansible thermo-plastic beads with a mass of intermeshed mineral fibers. Such beads can be expansible polyethylene or polystyrene materials, and can, if desired, be mixed with binder materials, preferably in a powdered form, or can be pre-coated with relatively small amounts of a sticky material such as gelatin, glue, ester gum, rosin, naturally occurring oils, such as those commercially available under the trade designation "Vinsol," or phenol-formaldehyde A-stage resins. A mixture comprising from 10 percent to 20 percent of a dry, phenol-formaldehyde, thermosettable resin with 90 percent to 80 percent of expansible polystyrene beads has been found to be suitable for use in the apparatus of FIG. 16. If desired, such foamable material, or another foamable material, can be associated with the fibers in the veil 81 just as the veil is accumulated on the collector 86. A spray dried mixture of 9 parts of an A-stage phenol-formaldehyde resin with 1 part of a blowing agent which liberates a nitrogen gas is also a suitable composition for use in the FIG. 16 apparatus. A specific example of a blowing agent which liberates a nitrogen gas is commercially available under the trade designation "Celogen" or "Celogen AZ," and is p,p'-oxy bis (benzene sulfonyl hydrazide). Other blowing agents are particularly suitable for use with thermoplastic materials, because they decompose and produce a gas at lower temperatures, for example, dinitroso pentamethylene tetramine and N,N'-dimethyl N,N'-dinitroso terephthalamide.

Apparatus shown in FIG. 17 differs from that shown in FIGS. 1 and 16 in that it is adapted for the production of continuous fibers of glass or other similar mineral, and the producton of a mass of intermeshed fibers from such continuous fibers. The FIG. 17 apparatus comprises a glass melting tank indicated generally at 87, from which a plurality of relatively small streams 88 of molten glass are drawn through orifices in bushings 89. The streams of molten glass are advanced axially by tension applied by means of pulling wheels 90, are thereby attenuated to a desired fiber diameter, and are collected into a strand by a gathering shoe 91. A plurality of the gathered fibers are drawn over a roll applicator 92 which dips into a tank 93 in which any suitable sizing material can be provided. The strand of fibers is projected downwardly from the pulling wheels 90 and is broken apart against a deflector plate 94 which throws the broken strand onto a conveyor 95. A foamable, foaming or foamed material is associated with the fibers as they advance toward the conveyor 95 from nozzles or inlets 96, to which the material is supplied from lines 97. The mass of mineral fibers which collects on the conveyor 95 is one where intermeshing, as discussed above, occurs to provide bodily integrity thereto. A second conveyor 98 is positioned above the conveyor 95, and is directed at an angle downwardly toward the conveyor 95 so that the mass comprising mineral fibers and associated material is compressed between the two conveyors to a desired extent.

The intermediate product which is produced on the conveyor 95 can be collected and transported to a remote point and there foamed, either in a relatively large mass or in a plurality of subdivided parts, as discussed above, but the FIG. 17 apparatus is particularly adapted for producing a final foamed material therefrom. To this end, additional inlet means 99 are provided through which a binder or a foamable material can be applied to the intermediate product before the latter is passed between compression rolls 100 and passed into an oven indicated generally at 101 for curing between conveyors 102 and 103. Supply rolls 104 and 105 are provided so that sheets 106 and 107 of cellophane, polyethylene, or other suitable flexible sheet material can be passed, respectively, over the lower roll 100 and under the upper roll 100, between the rolls and the fibrous material.

Figure 18:
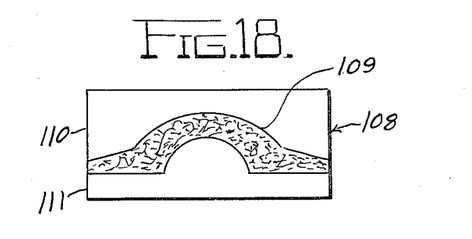
FIG. 18 is a view in vertical section showing a mass of coated mineral fibers intermeshed to an extent such that the mass has bodily integrity, associated in a suitable mold with a foamable binder, and represents a step in a comparatively simple batch method for producing a structure in accordance with the invention, for example from an intermediate product which can be made in the apparatus of FIGS. 1, 16 or 17.

It will be appreciated that the invention is not limited to the production of a generally flat article. A closed mold indicated generally at 108 in FIG. 18, of any suitable contour, can be used to produce an article of a particular shape. A pack 109 of fibers associated with a foamable material is placed in the mold, between mold parts 110 and 111, and the assembly is heated to foam and set the material. The mold 108 is of such shape that the final product, in this case, is a hat. The mold can also be lined with an appropriate sheet material, or the finished article can be sprayed with a binder, so that surface layers different from the core are provided, for example, surface layers having desired properties, such as toughness, hardness, resiliency, or the like. Numerous light weight articles of relatively simple shape can be produced in this manner, for example, boats, bath tubs, crash helmets, and the like, and suitable dyes or pigments can be used on the exterior to provide any desired color.

Figure 19:
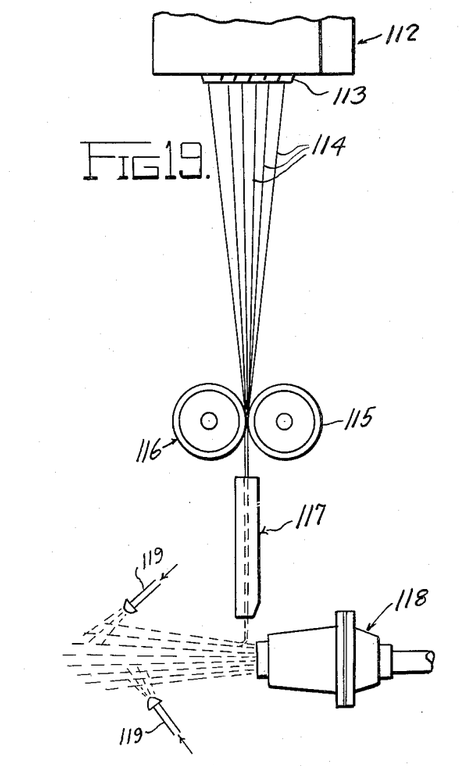
FIG. 19 is a view in vertical elevation of modified apparatus for producing mineral fibers and for associating a foamable, foaming or foamed material with such fibers.

Apparatus shown in FIG. 19 comprises a glass melting tank indicated generally at 112 with a bushing 113 in the bottom thereof through which comparatively large diameter streams 114 of molten glass flow. The streams 114, after solidification, are engaged by cooperating feed rolls 115 and 116, and urged through a guide member 117, from which they are discharged into a high velocity blast of flame and hot combustion products from a burner indicated generally at 118. The blast of flame and combustion products re-heats the glass, which is in the condition of relatively large diameter rodlets, to a temperature above its softening temperature, and projects the reheated rodlets to the left, and attenuates them into fibers. Streams of a foamable material are also introduced into the high velocity blast from means 119, which can be merely open ended tubes operatively associated with a suitable supply for the foamable material. The foamable material is projected to the left by the blast of combustion products and associated with the fibers, which are formed into a mass wherein individual fibers are intermeshed to an extent such that the mass has bodily integrity. An intermediate product composed of such mass of mineral fibers and associated foamable material can be collected on a suitable conveyor. The intermediate product is generally similar to the material 38 previously discussed in connection with FIG. 1, and can be converted to a final product in any suitable manner, for example by the action of heat while the product is in an at least partially confined space between two conveyors, in a closed mold, or in other ways.

It will be appreciated that, in the specific embodiment of the invention shown in FIG. 19, the foamable material is heated appreciably by the flame and combustion products. It is preferred, therefore, that the material be one which is not particularly heat sensitive, unless foaming and setting thereof are to be carried out concomitantly with or immediately after collection of the mass of mineral fibers associated with the material. In instances where it is desired to collect a mass of mineral fibers associated with a heat sensitive foamable material, and subsequently to produce a final product therefrom, it is preferred to introduce the foamable material into the stream of combustion products at a point more remote from the burner 118 where induced air has lowered the temperature of the stream, and of the glass fibers carried thereby, to a comparatively low temperature.

Figure 20:
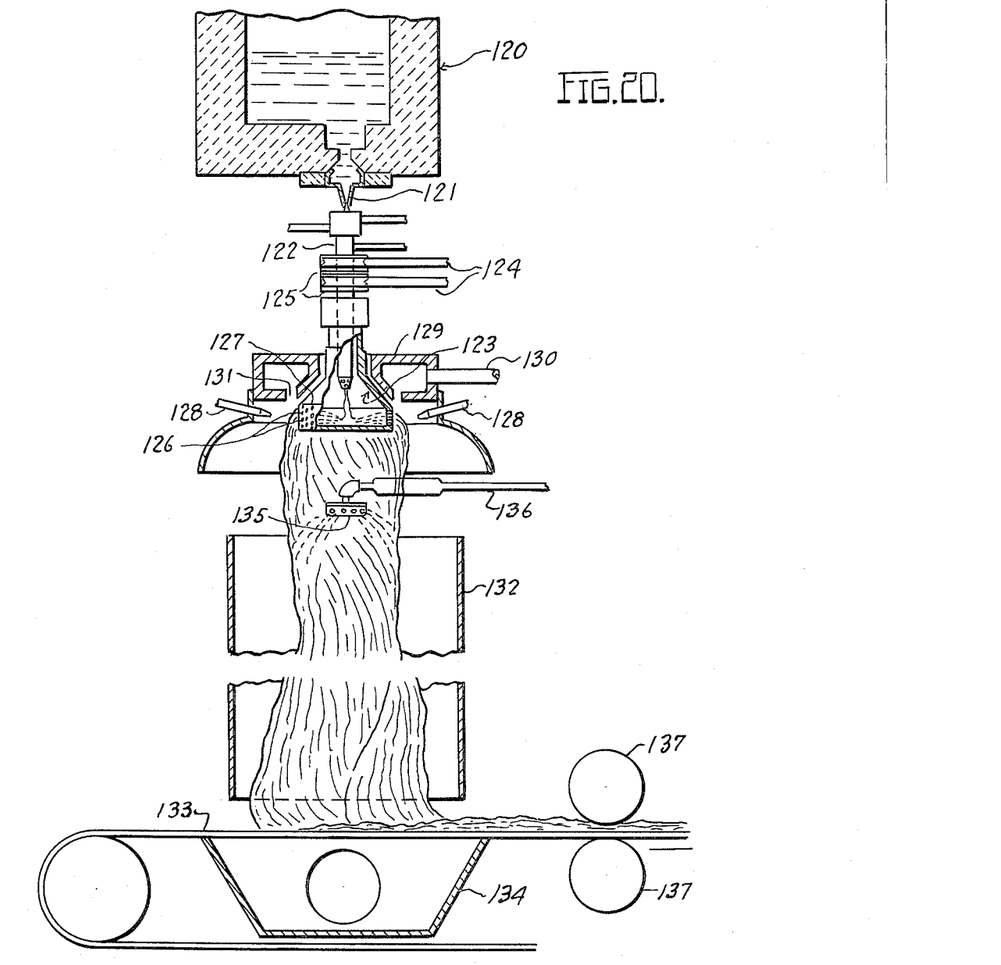
FIG. 20 is a view in vertical section showing still further modified apparatus for producing mineral fibers and for associating a foamable, foaming or foamed material therewith.

Apparatus shown in FIG. 20 comprises a glass melting tank indicated generally at 120, with a bushing 121 disposed at the bottom thereof. A stream of molten glass or other similar mineral material flows through an orifice in the bushing 121, through a central opening in a shaft 122 and into a centrifuge basket 123 which is keyed or otherwise attached to the shaft 122. The shaft 122 is rotated at comparatively high speeds by means of belts 124 which are operatively associated with sheaves 125, keyed or otherwise fastened to the shaft 122. Rotation of the shaft 122 causes rotation of the centrifuge basket 123 and of molten glass contained therein, so that the glass is thrown by centrifugal force through openings 126 in a generally cylindrical vertically extending wall 127 of the centrifuge basket. Burners 128 are provided to reheat, if desired, the fibers thrown through the openings 126. An annular blower 129 is disposed above, and laterally outwardly with respect to, the openings 126 in the centrifuge basket 123. Air, steam, or another gas can be supplied to the blower 129 through an inlet 130 and discharged through an annular opening 131 to establish a gentle downdraft to carry the fibers formed through a hood 132 and onto an appropriately driven conveyor 133. The conveyor 133 is preferably foraminous so that vacuum from a suction box 134 assists in collecting the fibers thereon. A spray head 135, operatively associated with an inlet means 136 for a foamable, foaming or foamed material, is disposed between the centrifuge basket 123 and the upper extremity of the hood 132, so that the material is associated with the fibers and a mass comprising intermeshed fibers associated with the material is collected on the conveyor. In the specific embodiment of the invention shown the intimacy of association of the material with the mass of fibers is increased by the action of squeeze rolls 137. The resulting intermediate material is converted to a final product comprising a mass of intermeshed mineral fibers associated with a foamed set material in any of the previously discussed ways.

Figure 21:
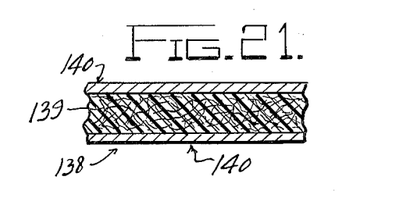
FIG. 21 is a view in vertical section showing one type of product which can be produced according to the method of the invention.

A product indicated generally at 138 in FIG. 21 comprises a central portion 139 composed of a mass of intermeshed mineral fibers associated with a foamed, set material, and webs or films 140 adhered to the portion 139. The product 138 can be produced in the apparatus of FIG. 1 by applying a hardenable binder to the exterior generally flat major surfaces of the intermediate product 38, and hardening such material while foaming and setting the material associated with the fibers in the oven 40. The product 138 can also be made in a similar manner by the method of FIG. 20. It can also be made by the method of FIG. 17, in which case the films 140 can either be the cellophane, polyethylene or the like sheets 106 and 107, or can be films produced by hardening of the material associated with the surfaces of the intermediate product from the inlet means 99.

Figure 22:
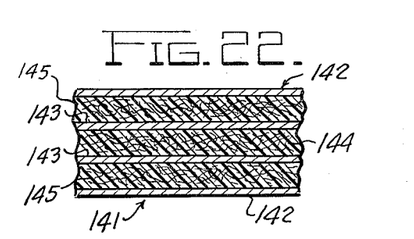
FIG. 22 is a vertical sectional view showing a particularly advantageous product which can be produced in accordance with the invention.

A final product of a particularly desirable type is indicated generally at 141 in FIG. 22. The product can be produced in the apparatus of FIG. 1, 17 or 20, modified to accommodate the provision of second and third bodily separate masses of intermeshed mineral fibers with sheet material separating the three masses from one another. The product comprises three layers of intermeshed mineral fibers intimately associated with a foamed material, and four continuous webs or films. Two webs 142 are on the exterior surfaces of the product, while webs 143 separate a center layer 144 of intermeshed mineral fibers associated with a foamed, set material from two similar outer layers 145. By varying the properties, densities and thicknesses of the various fibrous layers and the structures and densities of the four webs, it is possible to alter in many highly advantageous ways the overall properties of the product. In some instances, one or more of the fibrous layers can be merely a mass of intermeshed and interlocked fibers, not associated with a foamed material. In some cases it may be advantageous for the exterior webs 142 either to be continuous films or sheets of a hardened, flexible or elastomeric material or even for these webs to be metal, while, in other instances, it may be desirable for these to be continuous sheets of a hardened resinous material which has impregnated the outer fibrous layers to a limited degree. The two interior webs 143 can be of any desired practical material and can be, for example, the same as or different from the outer two webs.

The layers 144 and 145 can be the same or different, and specifically, can be of varying densities and compressive strengths. A particularly advantageous product results when the exterior webs 142 are weather resistant or decorative in nature and when the layers 145 are relatively soft masses of mineral fibers intimately associated with a foamed material so that the final product yields substantially even under light loads, while the layer 144 is a relatively dense material comprising a mass of mineral fibers intimately associated wtih the foamed material. In such a structure, the interior foamed layer should have comparatively high compressive strength in order to impart structural strength to the product. Such product is admirably suited for use as a crash pad on an automobile dashboard or the like, or as a shock absorbing packaging material generally. The relatively soft outer layers tend to spread the force of an impact against the product, while the relatively dense interior layer tends to absorb and dissipate the force.

Where the apparent density and comparative structural strengths of the layers 145 are high, as compared with those of the layer 144, the finished product makes an excellent roof deck material, provided that the exterior coating webs are weather resistant and comparatively tough. The interior side of such roof deck material can, if desired, be made decorative to eliminate the need for interior finishing of a building in which this product is used.

Figure 23:
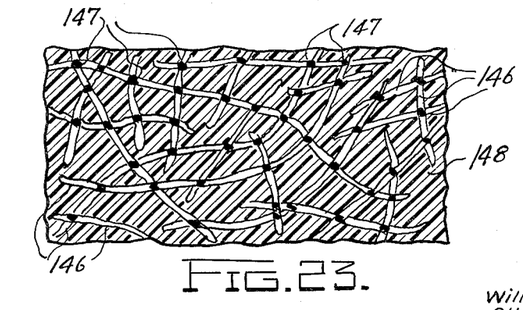
FIG. 23 is a fragmentary, schematic sectional view showing the relationships between the mass of intermeshed mineral fibers and an associated foamed material produced in accordance with the invention.

A product shown in FIG. 23 is representative, to a greatly enlarged scale, of an intimate association of a foamed material and a mass of mineral fibers made by the method of FIG. 1, of FIG. 16, of FIG. 19, or of FIG. 20. The product comprises a mass of intermeshed mineral fibers 146 interlocked by a suitable binder 147, and intimately associated with a foamed and set material 148, which is represented as a synthetic resinous material. It will be appreciated that some portions of the mass of mineral fibers are quite similar to those represented in FIGS. 2 through 5, while others are substantially more complex geometrically, although equivalent functionally insofar as the instant invention is concerned. When a mass of continuous filament or strand-mineral fibers is used, as in the FIG. 17 method, the structure of the final product is similar in appearance to that of the FIG. 23 article, except that there are fewer fiber ends, as a greater portion of the mass is composed of a single fiber or strand.

The following examples are presented solely for the purpose of further illustrating and disclosing the invention, and are in no way to be construed as limitations thereon.

Example 1

A structure which includes mineral fibers bonded to a foamed, hardened, synthetic resinous binder can be produced according to the following procedure:

A charge of 16 parts by weight of a soluble ash "A" stage phenolic resin, 0.48 part of bentonite as a thickener, 1.6 parts of ammonium carbonate as a foaming agent, and 5 parts of water is prepared, first adding the bentonite to the water, then the ammonium carbonate, and finally the resin. The mix is then agitated in any suitable way to accomplish a uniform dispersion, and sprayed through the inlet means 32 of FIG. 1 onto fibers inside the hood 36.

The fibers and associated foamable phenol formaldehyde resin are collected on the conveyor 34 and passed into the oven 40, as shown, and cured at temperatures up to 400° F. into a hard structural insulating board having an apparent density of from 4 to 12 pounds per cubic foot. A product having a density of 6.7 pounds per cubic foot can be made where the glass fibers and foamable resin are proportioned as 1.4 pounds per cubic foot to 5.3 pounds of organic foam. Similarly, a product having an apparent density of 8 pounds per cubic foot can be made using 1.8 pounds of glass fibers to 6.2 pounds of organic foam.

As much as about 0.16 part of polyoxyethylene sorbitan monopalmitate can be added to this foamable binder to produce smaller foam cells.

The foamable and hardenable synthetic resinous material described above can also be used in practicing the other methods which have previously been described herein.

Example 2

A mix was made as in Example 1, but an equal quantity of the material available under the trade designation "Celogen AZ" was substituted for the ammonium carbonate. The resulting foamable material was applied to fibers in the manner described in Example 1, and the pack collected was compressed in the oven 40 to produce a board composed of ½ lb. of glass per cubic foot and 1½ lb. of foamed phenolic resin per cubic foot. The fibers were of the insulating wool type, were of 3 inches to 3 feet in length, and had diameters of about sixty hundred thousandths of an inch.

Example 3

A mixture is prepared from 100 parts of a water soluble "A" stage phenol formaldehyde resin, 10 parts of whiting, or finely powdered calcium carbonate, and 10 parts of ammonium sulfate. Sufficient water is employed to dissolve the resin and ammonium sulfate and to dilute the mix to 10 to 15% solids. The resulting water dispersion is then sprayed into association with mineral fibers as described in Example 1, and an intermediate product is collected. During curing of the intermediate product between restricting belts, in an oven at 300 to 400° F., as described, the ammonium sulfate decomposes to volatile ammonia and sulfuric acid. The sulfuric acid reacts with the calcium carbonate to form carbon dioxide which puffs and foams the softened viscous resin into a foam, and also speeds up or accelerates the curing of the resin, causing a rapid rise in viscosity to a solid condition.

Example 4

Five parts by weight of expansible polystyrene beads and one part of powdered B stage phenol formaldehyde resin are mixed together and applied to fibers as shown in FIGS. 1, 16, 17, 19 or 20, and discussed in connection therewith. The intermediate products collected are composed of dry foamable binders associated with glass fibers. Upon subjecting these products to heat in an oven while restricted by surface covering conveyors or plates, a product of 2 lbs. per cubic foot of glass fibers with 2 lbs. per cubic foot of resin foam or 4 lbs. per cubic foot total apparent density is produced.

Example 5

A structure which includes mineral fibers bonded to a foam, hardened, inorganic cementitious binder can be produced according to the following procedure:

0.01 part of polyoxyethylene sorbitan mono-oleate as a wetting agent and 1.5 parts of magnesium sulfate heptahydrate ($MgSO_4 \cdot 7H_2O$) are dissolved in 1.5 parts of water. 0.25 part of ammonium carbonate and 0.05 part of a fatty alcohol sulfate commercially available under the trade designation "Duponol ME dry," are then added to the solution, followed by one part of calcined brucite (activated magnesium oxide). The entire mix is then subjected to rapid agitation for a period of about one to five minutes. The resulting inorganic cementitious binder dispersion is then associated with glass fiber as shown in FIG. 1, 17, 19 or 20, and discussed in connection therewith. The resulting intermediate product is then heated to a temperature of from about 180° F. to about 250° F. for from approximately one-half to about five minutes. The heating causes foaming of the binder dispersion, and also hardening thereof, while in a foamed condition, with the result that the mineral fibers are bonded to the foamed and hardened inorganic cementitious binder, which is a magnesium oxysulfate cement.

Example 6

Another foamable, hardenable, inorganic cementitious binder which can be utilized in practicing the method of the invention as described in Example 5 can be produced according to the following procedure:

A solution is prepared from 0.48 part of water, 0.01 part of polyoxyethylene sorbitan mono-oleate, 0.05 part of a fatty alcohol sulfate commercially available under the trade designation "Duponol ME dry" and 0.15 part of ammonium carbonate. One part of calcium sulfate hemihydrate ($CaSO_4 \cdot \frac{1}{2}H_2O$) is then thoroughly mixed with the resulting solution to produce a foamable, hardenable, gypsum type cementitious inorganic binder. This binder can be used as described in Example 2 in practicing the method of the invention.

*Example 7*

A foamable phenol formaldehyde binder has been produced by mixing 20 parts by weight of a low free formaldehyde phenol-formaldehyde partial condensation product commercially available under the trade designation "Bakelite BRL 2759" with 80 parts by weight of a low free formaldehyde phenol-formaldehyde partial condensation product commercially available under the trade designation "Bakelite BRL 2760." The mixing was carried out with rapid agitation to beat air into the mix. A second mix was prepared from 6.6 parts by weight of isopropyl ether as a foaming agent, and 1.0 part of polyoxyethylene sorbitan monopalmitate, and the second mix was added to the resin mixture; agitation was continued. 6.5 parts by weight of concentrated sulfuric acid and 0.91 part by weight of concentrated phosphoric acid were poured over 6.5 parts by weight of ice; when the ice had melted, the acid solution was added to the resin mix to produce a foamable resin, which was then associated with glass fibers as described in Example 1. A mass of intermeshed glass fibers having an apparent total density of 5 pounds per cubic foot was collected upon the conveyor 35, where the mass foamed spontaneously. The glass fibers were interlocked to one another in the product, and had an average diameter of about 115 hundred thousandths of an inch and lengths ranging from above 3 inches to about 3 feet or more. A thermoset foamed phenolic material bonded to the intermeshed fibers was produced by heat generated exothermically by the acid accelerated polymerization. The final product was suitable for structural uses; it could be sawed, and was capable of receiving nails. The product can be subdivided, for example, to about the size of popped corn or smaller, and blown into place as a dimensionally stable insulating material.

*Example 8*

A foamable resin suitable for use as described in Example 7 has also been produced by mixing 100 parts by weight of a polyester resinous composition commercially available under the trade designation "Plaskon FFR-5," 10 parts by weight of water, 1 part by weight of N-methyl morpholine, and 1 part by weight of an emulsifier, and then adding 210 parts by weight of toluene diisocyanates. A hard, high density (about 12.7 lbs. per cubic foot) fire resistant product which is capable of receiving nails and can be used as a wood substitute can be produced from this foamable binder.

Various products made in accordance with the invention, and comprising a mass of intermeshed mineral fibers intimately associated with a foamed, set material are porous in nature. It is sometimes desirable to reduce or eliminated the porosity. This can be accomplished after the porous product has been made, for example, by impregnating the porous product with a suitable binder, which can be organic or inorganic in nature and can be of any of the binders or treatments previously discussed. A specific example of a suitable impregnating binder can be produced from 27 parts of colloidal silicic acid and 73 parts of water. Any product of the invention having open pores can be impregnated with this binder, for example, by soaking the product therein. The specifically identified silicic acid binder tends not only to improve the physical properties of a porous product, but also to impart fireproof characteristics thereto.

Products manufactured in accordance with the invention can be made having various densities. It is obvious that both high and low density products can be made by the methods of the invention. By way of example, masses of glass fibers having densities of from 2 to 10 lbs. per cubic foot have been incorporated into 65 lbs. per cubic foot products made with foamed cementitious magnesium oxysulfate and gypsum-cements as binders. It is comparatively easy to achieve densities as low as 1 to 10 lbs. per cubic foot, for example, by intimately associating a foamed binder having a density of about ½ to 7 lbs. per cubic foot with a mass of intermeshed mineral fibers having a density of ½ to 3 lbs. per cubic foot. Impregnating such a product with an appropriate binder increases the apparent density of the product somewhat, but it is advantageous where specific properties are required.

It will be apparent that various changes and modifications can be made from the specific details disclosed in the drawings and discussed in connection therewith and in the examples without departing from the spirit and scope of the attached claims, and that, in its essential details, the invention provides a method for producing a structure which includes mineral fibers associated with a foamed, set material, which method comprises suspending a plurality of mineral fibers in a compressible fluid, associating a material with the suspended fibers, collecting the fibers, associated with the material, as a mass in which individual fibers are intermeshed to an extent such that the mass has bodily integrity, and advancing the material to a set, foamed condition, associated with the mineral fibers. The mineral fibers and the material are preferably suspended only temporarily in the compressible fluid, and most desirably at an intermediate point in the production of a mass of intermeshed mineral fibers between the flowing of streams of molten glass or other similar mineral and collection of a mass of intermeshed mineral fibers fabricated from the molten streams. The invention also contemplates a method for producing a useful intermediate product which is a mass of mineral fibers intermeshed to an extent such that the mass has bodily integrity, and a foamable material associated with the mineral fibers within the mass. Such intermediate products and various final products, for example those shown in FIGS. 21, 22 and 23 are also novel articles of manufacture.

The terms "percent" and "parts" are used herein and in the appended claims to refer to percent and parts by weight, unless otherwise indicated.

We claim:

1. A method for producing a structure which includes mineral fibers associated with a foamable, settable binder, which method comprises temporarily suspending separate streams of a plurality of mineral fibers, a thermosetting binder composition and a liquid foamable binder composition in a compressible fluid by projecting separate streams of the fibers and of the compositions through the compressible fluid, collecting the fibers, associated with the binder compositions, as a mass in which individual fibers are intermeshed to an extent such that the mass has bodily integrity, and converting the foamable binder composition, while associated with the mass of mineral fibers, to a sensibly dry, settable, foamable condition.

2. A method for producing a structure which includes mineral fibers associated with an expansible, thermoplastic material, which method comprises temporarily suspending in a compressible fluid, separate streams of a plurality of mineral fibers, a thermoplastic material which is expansible into a condition in which it occupies a greater volume under ambient conditions, and a liquid, thermosetting binder composition by projecting separate streams of the fibers, of the expansible material, and of the binder composition through the compressible fluid, collecting the fibers, associated with the expansible material and the binder composition, as a mass in which individual fibers are intermeshed to an extent such that the mass has bodily integrity, and converting the binder composition, while associated with the mass of mineral fibers and with the expansible thermoplastic material, to a sensibly dry, thermosetting condition.

3. A method for producing a structure which includes mineral fibers associated with an expansible thermoplastic material, which method comprises temporarily suspending separate streams of a plurality of mineral fibers, a thermoplastic material which is expansible into a condition in which it occupies a greater volume under ambient conditions, and a binder in a compressible fluid by projecting separate streams of the fibers, of the expansible material, and of the binder composition through the compressible fluid, and collecting the fibers, associated with the expansible material and the binder, as a mass in which individual fibers are intermeshed to an extent such that the mass has bodily integrity.

References Cited in the file of this patent

UNITED STATES PATENTS

| | | |
|---|---|---|
| 2,194,036 | Talalay | Mar. 19, 1940 |
| 2,242,372 | Schneider | May 20, 1941 |
| 2,298,986 | Taylor et al. | Oct. 13, 1942 |
| 2,576,073 | Kropa et al. | Nov. 20, 1951 |
| 2,604,427 | Armstrong et al. | July 22, 1952 |
| 2,629,698 | Sterling | Feb. 4, 1953 |
| 2,664,406 | Armstrong | Dec. 29, 1953 |
| 2,719,795 | Nottebohm | Oct. 4, 1955 |
| 2,802,766 | Leverenz | Aug. 13, 1957 |
| 2,850,421 | Thompson | Sept. 2, 1958 |
| 2,879,197 | Muskat et al. | Mar. 24, 1959 |